United States Patent
Lambert

(10) Patent No.: US 6,605,219 B2
(45) Date of Patent: Aug. 12, 2003

(54) WASTEWATER TREATMENT APPARATUS AND METHOD

(76) Inventor: Russell E. Lambert, Box 2004, Islamorada, FL (US) 33036

( * ) Notice: Subject to any disclaimer, the term of this patent is extended or adjusted under 35 U.S.C. 154(b) by 0 days.

(21) Appl. No.: 09/992,616

(22) Filed: Nov. 16, 2001

(65) Prior Publication Data

US 2002/0070163 A1 Jun. 13, 2002

Related U.S. Application Data

(60) Provisional application No. 60/255,745, filed on Dec. 13, 2000.

(51) Int. Cl.$^7$ ................................................ C02F 3/30
(52) U.S. Cl. .................... 210/605; 210/617; 210/622; 210/94; 210/109; 210/151; 210/196; 210/299; 210/532.2; 210/903; 210/906
(58) Field of Search ................. 210/605, 616, 210/617, 621, 622, 630, 150, 151, 194, 195.1, 196, 197, 258, 259, 299, 532.2, 94, 104, 109, 903, 906, 256

(56) References Cited

U.S. PATENT DOCUMENTS

| | | | | |
|---|---|---|---|---|
| 3,371,033 A | * | 2/1968 | Simmons et al. ............ | 210/151 |
| 3,966,608 A | * | 6/1976 | Mason et al. ................ | 210/197 |
| 4,009,098 A | | 2/1977 | Jeris | |
| 4,009,099 A | | 2/1977 | Jeris | |
| 4,322,296 A | | 3/1982 | Fan et al. | |
| 4,895,645 A | * | 1/1990 | Zorich, Jr. et al. .......... | 210/150 |
| 5,156,742 A | * | 10/1992 | Struewing ................... | 210/605 |
| 5,318,699 A | | 6/1994 | Robertson et al. .......... | 210/903 |
| 5,352,357 A | * | 10/1994 | Perry .......................... | 210/605 |
| 5,480,561 A | * | 1/1996 | Ball et al. ................. | 210/195.1 |
| 5,531,894 A | * | 7/1996 | Ball et al. .................... | 210/617 |
| 5,540,840 A | | 7/1996 | Heitkamp et al. | |
| 5,609,754 A | * | 3/1997 | Stuth .......................... | 210/151 |
| 5,620,602 A | * | 4/1997 | Stuth .......................... | 210/151 |
| 5,792,368 A | | 8/1998 | Robertson | |
| 5,879,567 A | | 3/1999 | Robertson | |
| 5,908,555 A | | 6/1999 | Reinsel et al. | |
| 5,989,416 A | * | 11/1999 | Gorton ..................... | 210/532.2 |
| 6,372,137 B1 | * | 4/2002 | Bounds ....................... | 210/622 |
| 6,444,126 B1 | * | 9/2002 | Gates et al. ................ | 210/617 |

* cited by examiner

*Primary Examiner*—Christopher Upton
(74) *Attorney, Agent, or Firm*—Mark D. Bowen, Esq.; Stearns Weaver Miller Weissler Alhadeff & Sitterson, P.A.

(57) ABSTRACT

A wastewater treatment system for use with a conventional septic tank, or other small-scale wastewater treatment facility, for enhancing wastewater treatment without requiring complex control or maintenance limitations. The system incorporates a plurality of primary functions that combine to oxidize, nitrify, denitrify and remove water borne total dissolved solids prior to effluent discharge. Included is a fluidized-bed reactor containing biofilm attached to carrier particulates for use in the purification of wastewater. The fluidized-bed reactor is configured to include two distinct regions, namely a "lower" aerobic region and an "upper" anoxic region, during normal operating conditions. The lower aerobic region uses aerobic facultative bacteria to oxidize Carbonaceous Biochemical Oxygen Demand (CBOD), organic (Kjeldahl) nitrogen, and ammonia while consuming the dissolved oxygen in the water. Simultaneously, denitrification occurs in the upper anoxic region of the same bed at the same time. The creation of an additional anoxic region is maintained in the lower region of the septic tank for times when the dissolved oxygen consumption of the reactor is insufficient to maintain an anoxic state in the upper region of said reactor. This additional anoxic region assures effective denitrification under all operating conditions. Aeration of the wastewater is achieved by motivation of suction generated by the circulation pump and oxygenation is enhanced by the pump impeller prior to entering the fluidized bed.

14 Claims, 2 Drawing Sheets

WASTEWATER TREATMENT APPARATUS AND METHOD

CROSS REFERENCE TO RELATED APPLICATIONS

This application claims the benefit of U.S. provisional patent application Serial No. 60/255,745, filed Dec. 13, 2000.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights.

BACKGROUND OF THE INVENTION

1. Field of the Invention

The present invention generally relates to wastewater treatment, and more particularly to an apparatus for enhancing biological and biochemical performance of on-site residential and/or commercial single or multiple compartment septic tank wastewater treatment systems thereby resulting in superior effluent discharge quality.

2. Description of the Background Art.

It has been found that treatment of wastewater for the reduction of biological oxygen demand (BOD), total organic carbon (TOC), and total suspended solids (TSS) can be accomplished using beds of particulate media that act as a carrier for viable bacteria forming the biological reaction. The particulate bed may be a fixed bed, such as the sand bed of a trickling filter, or a fluidized bed wherein the particulate bed functions in a fluidized condition. Fluidized bed biological reactors are very effective wastewater treatment devices due to the extremely high concentrations of viable bacteria maintained within the system. U.S. Pat. No. 4,009,098 issued to Jeris discloses the use of a fluidized bed for BOD removal. U.S. Pat. No. 4,009,099, issued to Jeris discloses the use of a fluidized bed to remove ammonia nitrogen (nitrification), and/or to denitrify in connection with the treatment of wastewater. U.S. Pat. No. 4,322,296, issued to Fan et al., discloses a method for wastewater treatment in fluidized bed biological reactors.

While the use of fluidized bed reactors has resulted in some success in wastewater treatment, constant air control maintenance and adjustment has always been required to maintain the overall combustion (slow oxidation) stoichiometry necessary to ensure that adequate performance is maintained, particularly when experiencing varying loading conditions. While performance may be maintained, monitored, and controlled in large-scale wastewater treatment facilities through the use of sophisticated controls as seen in typical sequential batch reaction systems, the availability and use of sophisticated controls in smaller scale applications, such as residential and/or on-site commercial treatment facilities, has not proven practical or cost effective. Accordingly, residential and smaller scale wastewater treatment facilities often function at less than optimal performance and thus fail to adequately treat wastewater prior to discharge into the surrounding environment.

Additionally, since any typical aerobic wastewater system is performing useful work (consuming dissolved oxygen) only when operating in an aerobic mode, use of automatic controls for the purpose of creating sequential batch reaction (typically necessary to force an air deprived or anoxic denitrification cycle) takes away significant useful time, and therefor overall treatment capacity, from a given daily period.

Combustion Stoichiometry

By way of the following example a proper stoichiometric balance is demonstrated. For instance, if a household were to generate 1000 liters/day of wastewater (264 gallons), and said wastewater contained approximately 200 mg/liter BOD (Biological Oxygen Demand), then the daily oxygen demand is 1000 liters/day×200 mg/liter=200,000 mg/day BOD. It should be noted that the calculation is measured in BOD, as opposed to CBOD, due to the fact that, in a typical septic tank almost 100% of the Total Nitrogen is in the form of ammonia which would not be included in a measurement of CBOD.

According to the system disclosed herein, air is introduced into the wastewater to elevate the dissolved oxygen content from close to zero to 3.5 mg/liter or higher. In addition, the flow rate through a fluidized bed oxidation chamber is specifically adjusted such that substantially all of the dissolved oxygen is consumed. By way of example, at a flow rate of 40 liters/minute, dissolved oxygen will be consumed at a rate of approximately 200,000 mg/day as follows: At a flow rate of 40 liters/minute×3.5 mg/liter dissolved oxygen×60 minutes/hour×24 hours/day=dissolved oxygen consumption is 201,600 mg/day. Thus, in suitable biological presence an application of just the right amount of oxygen (oxidizer), presented with just the right amount of fuel (BOD), near perfect oxidation, and therefor system performance, can be observed. Measurement of dissolved oxygen factor of water entering the fluidized bed minus dissolved oxygen factor of water exiting the fluidized bed times the flow rate will provide a realistic calculation of performance.

There remains a need for an improved wastewater treatment system capable of performing multiple functions to optimize system performance while requiring no day-to-day adjustments based upon daily loading, as well as no particular scheduled maintenance. There further exists a particular need for a device that can metabolize Carbonaceous Biochemical Oxygen Demand (CBOD) and protein compounds of Organic (Kjeldahl) Nitrogen, while simultaneously reducing Total Nitrogen levels by first converting Ammonia to Nitrite through the use of aerobic facultative Nitrosomonas bacteria, and subsequently converting Nitrite to Nitrate using aerobic facultative Nitrobacter. Simultaneous denitrification must also occur for any such system to completely convert Nitrate to harmless Nitrogen gas. There particularly exists a need for an effective, low-cost, wastewater treatment system for use in conjunction with residential and/or light commercial wastewater devices (e.g. septic tanks) that provides highly effective performance while requiring minimal controls or scheduled maintenance.

BRIEF SUMMARY OF THE INVENTION

The present invention provides a wastewater treatment system for use with a conventional septic tank, or other small-scale wastewater treatment system, for enhancing wastewater treatment without requiring complex control or maintenance limitations. The system of the present invention incorporates a plurality of primary functions that combine to oxidize, nitrify, denitrify and remove water borne total dissolved solids prior to effluent discharge. Included is a fluidized-bed reactor containing biofilm attached to carrier particulates for use in the purification of wastewater. The fluidized-bed reactor is configured to include two distinct regions, namely a "lower" aerobic region and an "upper" anoxic region, during normal operating conditions. The lower aerobic region uses aerobic facultative bacteria to oxidize Carbonaceous Biochemical Oxygen Demand (CBOD), organic (Kjeldahl) nitrogen, and ammonia while consuming the dissolved oxygen in the water. Simultaneously, denitrification occurs in the upper anoxic region of the same bed at the same time. The creation of an additional anoxic region is provided elsewhere in the system for times when the workload is decreased and therefore dissolved oxygen consumption of the reactor becomes too low to maintain an anoxic state in the upper region of said reactor. This additional anoxic region assures effective denitrification under all operating conditions.

In addition, the system disclosed herein can be easily installed either inside (in-situ) a septic tank structure, or nearby, in an above ground configuration (ex-situ) in conjunction with an existing septic tank, thereby allowing for an extremely universal application.

DETAILED DESCRIPTION OF THE PREFERRED EMBODIMENTS

Figure 1:
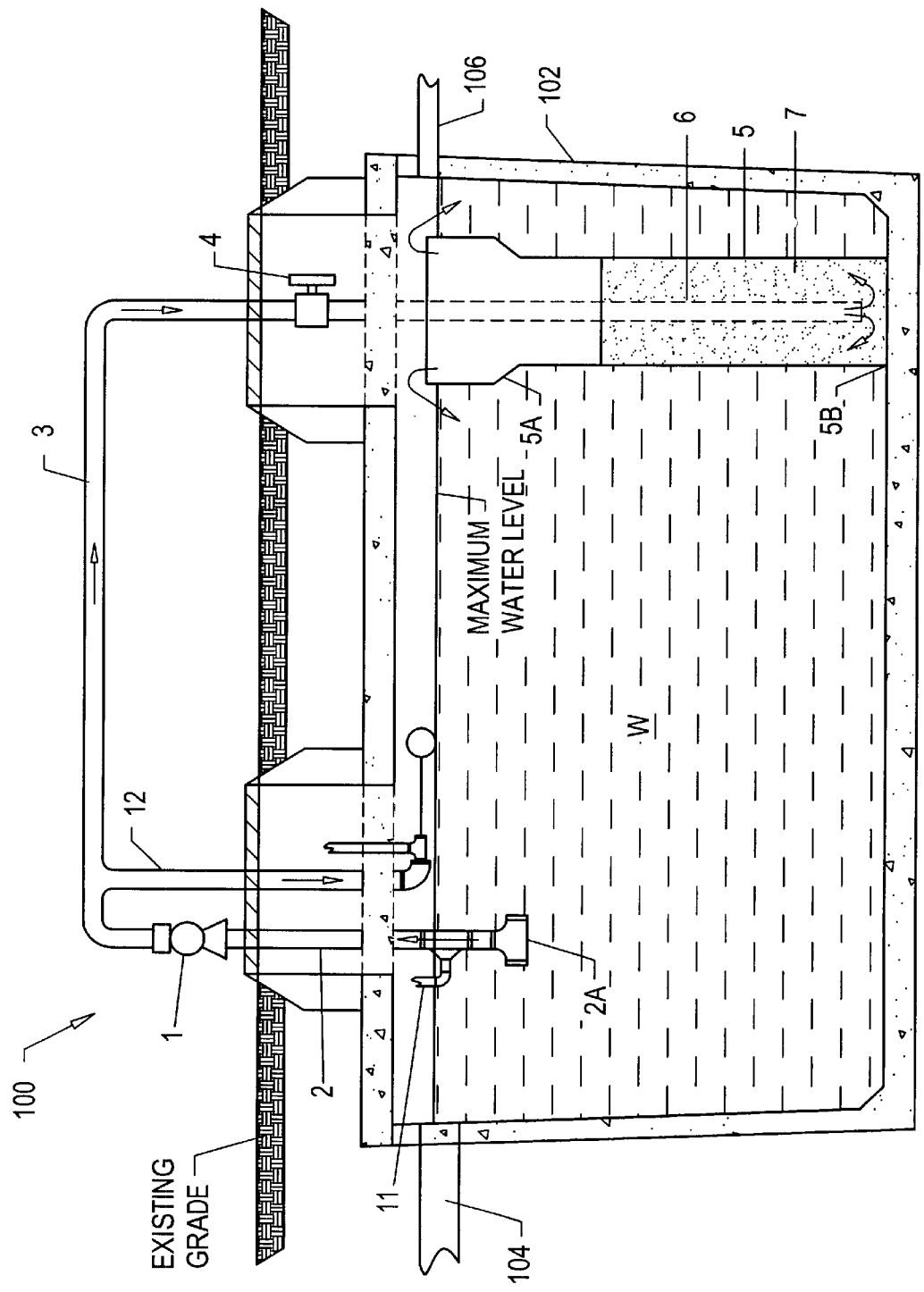
FIG. 1 is a schematic illustration of a wastewater treatment system according to the present invention depicted in-situ in conjunction with a conventional septic tank structure.

With reference now to the drawings, FIG. 1 depicts a preferred embodiment of the present invention, generally referenced as 100, which comprises a system for treating wastewater. As depicted in FIG. 1, the system may be adapted for use in conjunction, in-situ fashion, with an existing septic tank, referenced as 102, to enhance purification of wastewater prior to discharge into the environment. As is common, septic tank 102 includes a wastewater inlet 104 and a wastewater outlet 106 in communication with a drain field or other suitable receiving entity for accepting effluent discharge.

A wastewater treatment system according to the present invention includes a water circulation pump 1 having a suction inlet in fluid communication with a wastewater source "W" contained within septic tank 102 via suction line 2. An air inlet line 11 is connected to suction line 2 below the wastewater surface for allowing air to be drawn into suction line 2 prior to the flow entering the inlet of pump 1. The positioning of the air inlet line connection below the wastewater surface is effective in preventing the loss of prime for pump 1 when the pump is turned off. Suction line 2 preferably terminates in a submerged wastewater inlet 2A disposed in the upper region of the wastewater source "W" contained within septic tank 102. In a preferred embodiment, wastewater inlet 2A comprises an inverted multi-inlet T-shaped fitting so as to draw wastewater into suction line 2 from opposing generally horizontal directions at or near the surface so as to minimize disturbance of the wastewater source, particularly disturbances in wastewater stratification. Wastewater inlet 2A further includes restricted inlet apertures for drawing air into the wastewater thereby oxygenating the wastewater stream as more fully discussed hereinbelow.

Circulation pump 1 has an outlet in fluid communication with an oxidation chamber comprised of a fluidized bed reactor, generally referenced as 5, via wastewater conduit 3. In an alternate and optional embodiment, the pump outlet is further in parallel fluid communication with a pressurized discharge line, referenced as 12. Flow through discharge line 12 is regulated by a float-actuated valve 14, disposed within septic tank 102. Valve 14 opens when the level of wastewater within tank 102 reaches or exceeds a predetermined maximum level so as to divert wastewater from the tank through discharge line 12 in a discharge mode. In the discharge mode, flow may be diverted from tank 102 directly to a drain field or other suitable receiving entity (not shown), or indirectly to a drain field or other suitable receiving entity after first passing through an additional stage of filtration, such as an additional stage of filtration for removing other contaminants such as phosphorous as more fully disclosed herein.

Figure 2:
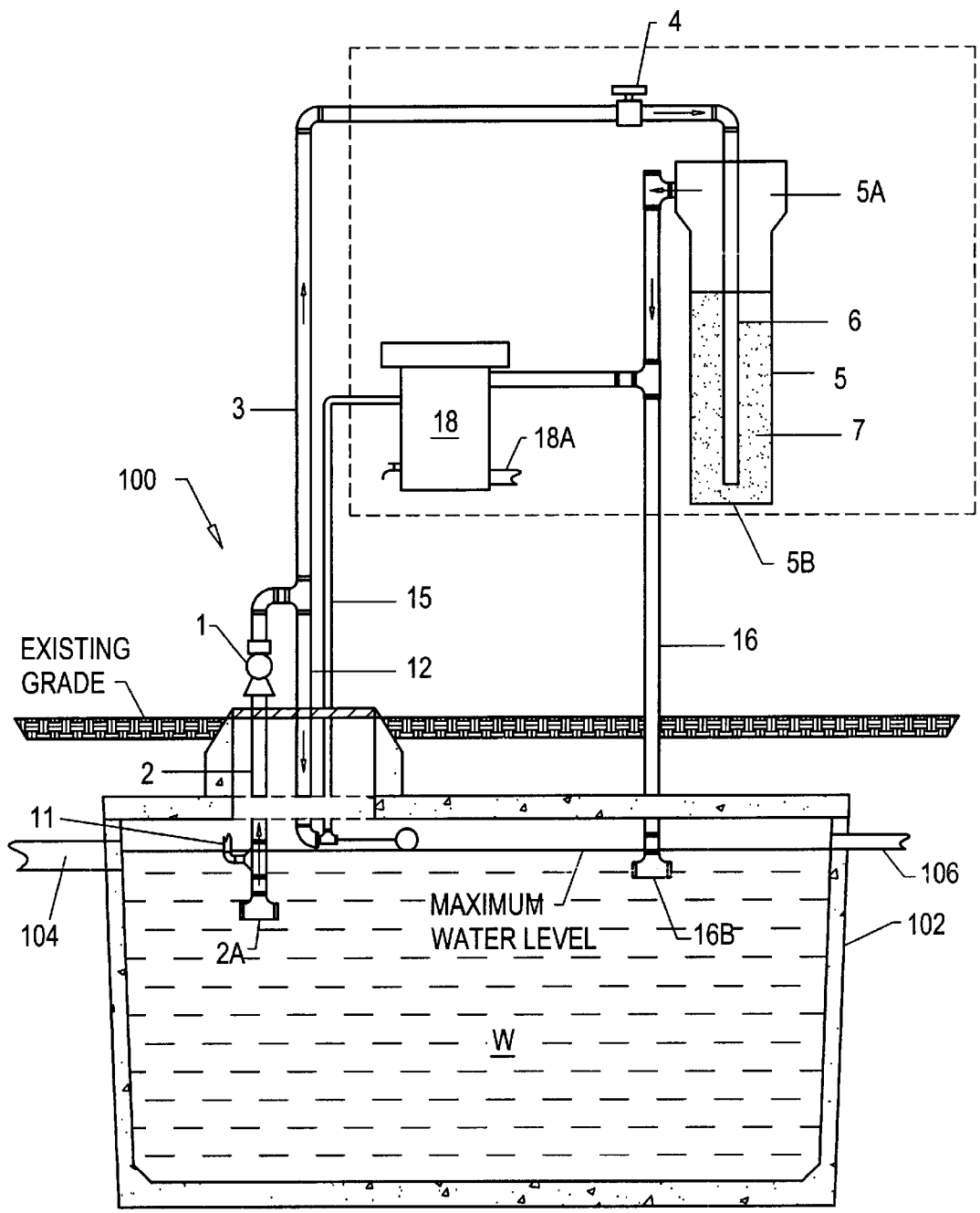
FIG. 2 is a schematic illustration of a wastewater treatment system according to the present invention depicted ex-situ in conjunction with a conventional septic tank structure.

In a preferred embodiment, a fluidized bed reactor functions as an oxidation chamber and comprises an elongate, optically translucent, vertically disposed vessel 5 having an open top end 5A and a closed bottom end 5B. A particulate bed filter medium, referenced as 7, is contained within the vessel. A wastewater feed line 6, in fluid communication with the wastewater source and air source via circulation pump 1, has an outlet disposed in the bottom region of the fluidized bed as best depicted in FIGS. 1 and 2. In a preferred embodiment, the filter medium 7 comprises a particulate bed wherein carrier particulate matter functions as a carrier for biofilm that is effective in the purification of wastewater. It has been found that sand, of suitable size and specific gravity, provides a suitable material for use as carrier particulate to form the particulate bed. A suitable size is predicated on surface area, and suitable specific gravity is predicated on maintaining the particulate medium within the containment vessel. Oxygenated wastewater is pumped into the fluidized-bed reactor vessel 5 through conduit 3, control valve 4, and wastewater feed line 6 where the wastewater is discharged into the bottom of vessel 5 whereafter the water is caused to flow upward through the vessel thereby fluidizing the filter medium particulate matter. The top portion of the fluidized bed assembly, and more particularly the top portion of the fluidized bed vessel 5 is preferably open to allow wastewater to escape therefrom into tank 102 by spill over in an embodiment wherein vessel 5 is disposed within a septic tank. In addition, the top portion of vessel 5, referenced as 5A, may be radially enlarged relative to the remaining portion of the vessel to reduce the velocity of water prior to spill over so as to prevent portions of the particulate bed from escaping the vessel along with the wastewater.

As noted hereinabove, the fluidized bed vessel 5 is preferably fabricated from an optically translucent material, which significantly allows for the visual inspection of the filter bed 7, when in the fluidized and non-fluidized state. When installed in an ex-situ configuration as shown in FIG. 2, the translucent property of vessel 5 provides for visual inspection of the fluidized bed column 7 thereby enabling installation and/or maintenance personnel to monitor and observe the particulate media contained within vessel 5. Thus, the use of an optically translucent and/or transparent vessel allows for visual confirmation that the appropriate volume of particulate media is contained within the vessel. Visual inspection is most effective when water flow through the feed line 6 is shut-off so that the particulate media collapses in a non-fluidized state thus allowing confirmation that the collapsed bed is at an optimal and adequate level. Water flow may be interrupted by intentional interruption of power to circulation pump 1 and/or by shut-off of control valve 4. Likewise, proper flow rate can be visually verified by observing proper fluidized bed expansion (height) and adjusted by using control valve 4, during start up. In-situ applications, where direct visual observation is not practical, will require verification of the appropriate fill conditions using a measurement probe since visual inspection is prevented due to the location of vessel 5 within buried tank 102.

In applications wherein the present invention is used with a multiple compartment septic tank, wastewater is preferably drawn from top of the water column in the last compartment, and returned to the top of the water column of the first compartment.

Pump 1 draws wastewater from the top of the water column of wastewater source "W", through a suction line 2 via restricted inlet 2A. A significant aspect of the present invention involves aeration of the wastewater after being drawn from septic tank 102. The present invention particularly avoids aeration of wastewater within tank 102. In a preferred embodiment, a flow restrictor 2A comprises a throttle valve that causes a small pressure drop ($\Delta P$) and consequent low-pressure area in the suction line thereby allowing the intake of air into said suction line via air intake line 11. The intake of air serves to perform two functions, namely: to cause oxygenation of the water with extreme efficiency, without requiring additional energy, by introducing the aerated water directly to the impeller of the pump; and, to cause slight cavitation of the pump, thereby reducing discharge pressure and causing overall energy consumption to decrease. Previous technologies have called for the use of injectors to aerate wastewater contained in a septic tank using of the pressurized motive force of a pump. Such technologies cause the need for a larger pump, at an increase of energy consumption. Additionally, use of those technologies, with their small orifices, has seen the need to employ the use of strainers to prevent clogging. The use of strainers is undesirable due to the need to service said strainers. Finally, such technologies disrupt the wastewater and prevent the formation and maintenance of an anoxic denitrification zone within the lower regions of the tank.

It has been found that introducing air into the wastewater stream on the suction side of pump 1 ultimately optimizes aeration of the wastewater as the pump impeller assists in the oxygenation process. Specifically, the pump impeller breaks down large air bubbles into fine, almost microscopic, air bubbles thus providing improved oxygen absorption. Another advantage of the aeration method utilized by the present invention is the exfoliation of filter media 7 within fluidized vessel 5 as the microscopic bubbles have been found to recombine while passing though the filter media thereby dislodging flock from the media bed. The exfoliation of the filter media maintains the efficiency of fluidized filter 5. Furthermore, by locating the connection point for air inlet 11 below the surface of the wastewater within tank 102 (e.g. submerged), loss of pump prime for circulation pump 1 is avoided in the event of power interruption.

Wastewater flows through conduit 3 to fluidized-bed vessel 5 via control valve 4. The wastewater then passes through feed line 6 to the bottom portion of the fluidized bed vessel 5 where it is discharged into the fluidized bed vessel 5 and forced into a reverse direction (e.g. vertically upward) so as to pass upwardly through particulate bed 7, contained within vessel 5, thereby resulting in fluidization of the bed. Particulate bed 7 preferably comprises granular material, which granular material combines to provide a substantial overall surface area. It has been found that sand particles provide a suitable choice for said granular material. Accordingly, the fluidized-bed contains ammonia degrading biofilm attached to carrier particulates for use in the purification of wastewater and thereby functions as a biological reactor. It has been found that aerobic facultative bacteria associated with the biofilm attached to the individual particles, metabolizes the CBOD and organic (Kjeldahl) nitrogen in the water while simultaneously converting ammonia ultimately to nitrate and consuming the available dissolved oxygen. As a result of the substantial consumption and resulting reduction of the dissolved oxygen, the upper portion of the column is effectively maintained in an anoxic or oxygen depleted state. Significantly, the presence of the anoxic zone causes said facultative bacteria to metabolize nitrates and respire nitrogen, thereby reducing the Total Nitrogen factor of the water. It is well documented that in an anoxic environment, the facultative bacteria will, in the presence of an organic carbon food source, contribute to denitrify thereby maintaining nitrate to barely detectable levels. Water in an anoxic state is allowed to escape through the top of the bed column through open end 5A, where it is discharged back into the top of the water column of the septic tank for continued recirculation.

Thus, during periods of decreased wastewater loading the fluidized bed filter may not be capable of consuming all of the oxygen in the lower portion of the filter thereby causing the upper region to become aerobic and no longer capable of denitrification. However, the system of the present invention significantly continues to accomplish denitrification since a quiescent state in the lower region of the septic tank is maintained, thereby maintaining an anoxic zone containing organic carbon that is suitable for use as a denitrification food source. As a result, the present invention continuously metabolizes CBOD and nitrifies ammonia, while simultaneously denitrifying.

The present invention is adaptable for an alternate installation in an ex-situ application, depicted in FIG. 2. As best seen in FIG. 2, vessel 5 is installed remotely from septic tank 102 and a return wastewater line 16 is used to return water from the fluidized bed vessel to the upper most portion of the septic tank. Return line 16 has a first end 16A in fluid communication with vessel 5 by connection proximate discharge 5A, and a second end 16B in fluid communication with the wastewater source "W" within tank 102. Second end 16B preferably includes a T-shaped pipe-fitting disposed in a submerged location near the top of septic tank 102 so as to return water to the tank while minimizing disturbance of the wastewater.

Since the wastewater contains a very low concentration of dissolved oxygen both when it is drawn from the uppermost portion of the water column of the septic tank and when it is returned to the uppermost portion of the water column of the septic tank, the overall septic tank is maintained in a very quiescent and relatively dissolved oxygen free condition. This serves two purposes, namely: non-colloidal suspended solids are encouraged to settle to the bottom of the tank and add to sludge layer; and secondly, the maintenance of a quiescent and oxygen free condition within the water column of the septic tank creates a region for denitrification to occur on a constant and continual basis, providing for superior Total Nitrogen reduction. The existence of the sludge layer on the bottom of the septic tank, in close proximity to the lower portion of the water column causes the necessary organic carbon to be available for denitrification, even at times when the CBOD factor of the wastewater in the upper portion of the water column of the septic tank approaches zero.

Ultimate discharge can be accomplished in one of two ways: (1) in an application calling simply for reductions in Carbonaceous Biochemical Oxygen Demand, Organic (Kjeldahl) Nitrogen, Total Suspended Solids And Total Nitrogen, simple hydraulic discharge via tank outlet 106 (e.g. quantity of water "in" is equal to quantity of water "out") into a drain field or other suitable receiving entity completes the process; and/or (2) in applications requiring further and additional treatment, pressurized float controlled discharge through float valve 14 can direct the discharge flow to an additional treatment/absorption tank prior to ultimate discharge.

The pressurization of said discharge is unique, significant and important because many of the absorption/adsorption media and compounds are rather tightly packed, and unable to adequately flow under hydraulic pressures alone causing back ups and overflows.

In applications where further treatment to remove phosphates is desired, the present invention contemplates an additional stage of filtration as best depicted in FIG. 2. Specifically, when the wastewater level within septic tank 102 reaches a predetermined maximum level, float valve 14 is actuated thereby permitting pressurized flow through conduit 12, valve 14, and conduit 15 to a phosphate filter 18. Phosphate filter 18 preferably includes a light expanded clay aggregate absorption material, identified as L.E.C.A., which material has proven successful in removing phosphates from wastewater by absorption and adsorption. Wastewater passing through phosphate filter 18 may be subsequently discharged via outlet 18A to a drain field or other suitable receiving entity.

The system disclosed herein provides a biological oxidation chamber design that is capable of consuming seemingly limitless quantities of dissolved oxygen. Typically, it is important that the amount of oxygen demand and the amount of oxygen supplied be substantially equivalent, since too little air results in incomplete treatment and increased BOD while too much air results in loss of denitrification abilities and consequential excessive nitrates. Typically, for peak efficiency, proper stoichiometry must be observed. This is not a practical situation for universal unattended application. The present invention, however, is capable of denitrification in spite of the presence of excessive dissolved oxygen levels by maintaining an additional denitrification zone in the lower region of the septic tank that effectively reduces excessive nitrates on a constant and continuous basis. Specifically, the bottom sludge layer within the septic tank provides an anoxic region wherein organic carbon facilitates denitrification even during periods when CBOD of water column within the septic tank approaches zero.

Accordingly, the fluidized bed assembly is preferably fabricated in the form of a column having an open top portion that functions as a spill over. The combination of the column dimensions and surface area of the particulate contained therein, as well as the wastewater characteristics and flow rates are all significant in the design and sizing of the system. In normal operation, substantially all of the dissolved oxygen is consumed by the time the wastewater reaches the top portion of the fluidized bed such that said top portion is substantially anoxic. Thus, denitrification can be accomplished in the fluidized bed assembly since the upper portion thereof is typically found to be in an anoxic state.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What I claim is:

1. A wastewater treatment system for enhancing the biological and biochemical performance of on-site residential and commercial single or multiple compartment septic tank type treatment systems prior to effluent discharge, said wastewater treatment system comprising:

a septic tank containing a body of wastewater, said septic tank having an inlet in communication with a wastewater source and an outlet in communication with a drain field;

a fluidized bed filter including a vessel having a closed bottom end and a top end forming an outlet, said outlet in communication with said body of wastewater, said vessel containing particulate material colonized with bacteria capable of simultaneous ammonia and CBOD reduction;

a circulation pump having a suction inlet in fluid communication with said body of wastewater and an outlet in fluid communication with a lower region of said fluidized bed filter;

said pump inlet including means for aerating said wastewater by motivation of suction created by said pump.

2. A wastewater treatment system according to claim 1, wherein said means for aerating said wastewater includes an ambient air intake conduit in communication with said suction inlet at a location submerged below the wastewater surface.

3. A wastewater treatment system according to claim 1, wherein said pump inlet is in fluid communication with a wastewater intake submerged within said body of wastewater, whereby a prime is maintained for said pump during periods wherein said pump is de-energized.

4. A wastewater treatment system according to claim 3 wherein said wastewater intake is disposed in an upper region of said body of wastewater, said intake having openings disposed for drawing in wastewater horizontally so as to minimize disturbances in wastewater stratification while drawing wastewater therethrough.

5. A wastewater treatment system according to claim 1, wherein said fluidized bed filter is disposed within said septic tank, and wherein said vessel top end is radially enlarged, whereby wastewater enters said vessel at a lower region thereof, flows upwardly therethrough, and exits said top end by spill over into said septic tank.

6. A wastewater treatment system according to claim 1, further including wastewater discharge means in communication with said pump outlet for discharging wastewater from said septic tank to said drain field or other suitable receiving entity when the level of wastewater exceeds a predetermined maximum level.

7. A wastewater treatment system according to claim 1, wherein said vessel is translucent to permit visual inspection of said particulate media in both fluidized and non-fluidized conditions.

8. A wastewater treatment system according to claim 1, further including wastewater discharge means for directing flow through a phosphorous removal means for reducing levels of phosphates in said wastewater prior to discharge.

9. A wastewater treatment system according to claim 8, wherein said phosphorous removal means includes filter media consisting of light expanded clay aggregate.

10. A wastewater treatment system for enhancing the biological and biochemical performance of on-site residential and commercial single or multiple compartment septic tank type treatment systems prior to effluent discharge, said wastewater treatment system comprising:

- a septic tank containing a body of wastewater, said septic tank having an inlet in communication with a wastewater source and an outlet in communication with a drain field;
- a fluidized bed filter including a vessel having a closed bottom end and a top end forming an outlet, said outlet in communication with an upper region of said body of wastewater, said vessel containing particulate material colonized with ammonia degrading bacteria, said vessel formed from translucent material for permitting visual inspection of said particulate media;
- a circulation pump having a suction inlet in fluid communication with an upper region of said body of wastewater and an outlet in fluid communication with a lower region of said fluidized bed filter;
- said pump inlet in fluid communication with a wastewater intake submerged within said body of wastewater, said intake defining apertures disposed in an upper region of said body of wastewater;
- an air intake conduit for aerating said wastewater by motivation of suction created by said pump, said air intake conduit having a first end in fluid communication with the atmosphere and a second end in fluid communication with said wastewater intake below the surface of said body of wastewater for introducing air into said wastewater between said intake and said pump inlet, whereby wastewater and air passing through said pump are mixed by said pump;
- whereby activation of said pump causes wastewater to be drawn through said wastewater intake, aerated, circulated through said fluidized bed filter wherein bacteria reduce ammonia and CBOD levels while simultaneously denitrifying and returned to the septic tank for re-circulation.

11. A wastewater treatment system according to claim 10, further including means for removing phosphates from said wastewater.

12. A wastewater treatment system according to claim 11, wherein said means for removing phosphates from said wastewater includes a phosphate filter including light expanded clay aggregate material filter media.

13. A method of wastewater treatment for enhancing the biological and biochemical performance of on-site residential and commercial single or multiple compartment septic tank type treatment systems prior to effluent discharge, said method of wastewater treatment system including the following steps:

(a) drawing wastewater from an upper region of a body of wastewater contained within a septic tank using suction generated by a pump;

(b) aerating wastewater drawn from said body of wastewater by motivation of suction generated by said pump;

(c) pumping said wastewater through a fluidized bed filter, said fluidized bed filter including a vessel having a closed bottom end and a top end forming an outlet, said outlet in communication with said body of wastewater, said vessel containing particulate material colonized with ammonia and CBOD degrading bacteria, whereby said bacteria function to reduce ammonia levels by nitrification in a lower, aerobic region of said vessel while simultaneously denitrifying said wastewater in an upper, anoxic region of said vessel;

(d) maintaining an anoxic zone with available organic carbon in close proximity to a sludge layer existing at the bottom of said septic tank for enabling constant and continuous denitrification;

(e) returning said wastewater to an upper region of said body of wastewater for re-circulation.

14. A method of wastewater treatment according to claim 13, further including the steps of:

(e) removing phosphate from said wastewater by passing said wastewater through a phosphate filter.

* * * * *